United States Patent [19]

Hogg

[11] Patent Number: 4,509,713
[45] Date of Patent: Apr. 9, 1985

[54] LOCKING WALL HANGER

[76] Inventor: James W. Hogg, 6216 Hillsboro Rd., Nashville, Tenn. 37215

[21] Appl. No.: 643,767

[22] Filed: Aug. 24, 1984

Related U.S. Application Data

[63] Continuation of Ser. No. 377,192, May 11, 1982.

[51] Int. Cl.³ .............................................. F16M 13/00
[52] U.S. Cl. ................................ 248/546; 248/217.4; 248/218.3
[58] Field of Search ............ 248/546, 549, 544, 218.3, 248/218.2, 217.4

[56] References Cited

U.S. PATENT DOCUMENTS

| 241,991 | 5/1881 | Jones. | |
| 472,948 | 4/1892 | Gorton | 248/218.3 X |
| 770,163 | 9/1904 | Cobb | 248/218.3 X |
| 965,826 | 7/1910 | Lynch | 248/217.4 X |
| 1,292,956 | 1/1919 | McConnal | 248/217.4 X |
| 1,445,372 | 2/1923 | Wagner. | |
| 2,789,783 | 4/1957 | Jones | 248/220 |
| 3,219,302 | 11/1965 | Smith | 248/220 |

FOREIGN PATENT DOCUMENTS 37392 7/1923 Norway.

Primary Examiner—Ramon S. Britts
Assistant Examiner—Sarah A. Lechok
Attorney, Agent, or Firm—Fisher, Christen & Sabol

[57] ABSTRACT

A one-piece hanger for supporting objects on a wall is disclosed which initially penetrates, and upon full insertion, is substantially irreversibly locked in the wall so that rotation relative to, or removal from, the wall is prevented. The hanger comprises a spring wire element including a straight shank portion which connects a front hook portion with a rear locking portion. The latter has a parabola-like shape, terminates in a pointed and threaded penetrator, and overlies substantially all of the shank portion. A disc or flange is fixed on the forward, outer end of and in generally perpendicular relation with the shank portion and abuts generally flush with the wall when the hanger is mounted on the wall. In mounting the hanger on the wall, the pointed penetrator is first forced through the front face of the wall to form a hole through the wall. As the hanger advances through the hole, the penetrator arches unwardly and back towards the wall and pierces and embeds itself in the rear surface of the wall. The hanger is substantially irreleasably locked in the wall when advanced yet further into the hole so that the curvature of the locking portion is deformed by bowing out. Removal of the hanger from the wall is thus prevented until the locking portion is restored to its original curvature by application of an appropriate forwardly directed pulling force of very substantial magnitude.

9 Claims, 6 Drawing Figures

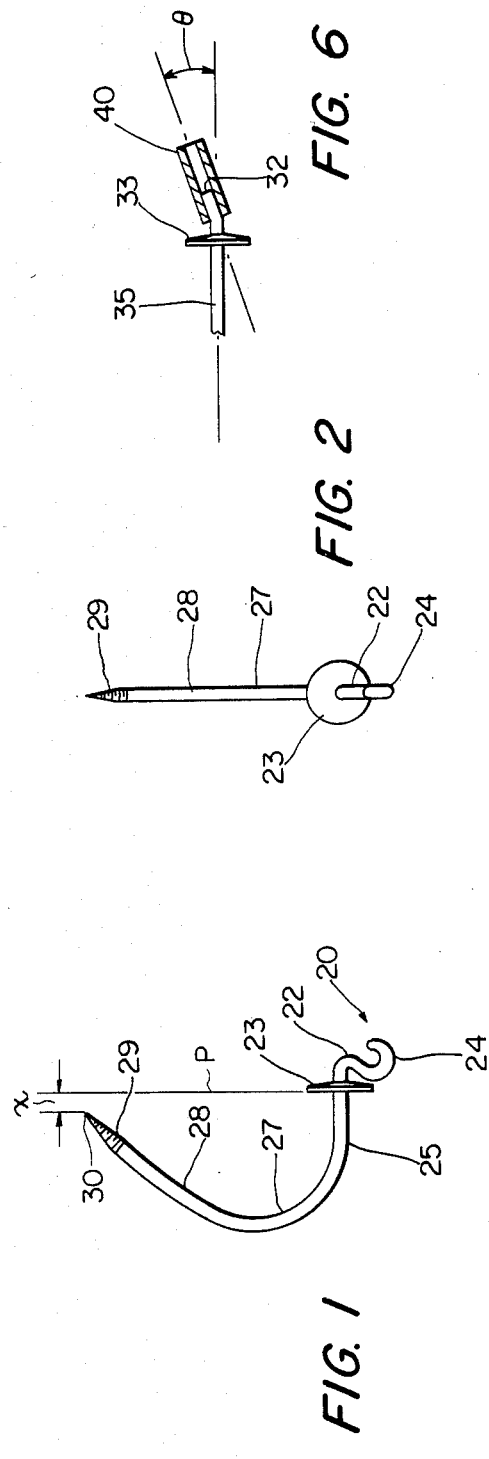

LOCKING WALL HANGER

This application is a continuation of application Ser. No. 377,192, filed May 11, 1982.

BACKGROUND OF THE INVENTION

1. Field of the Invention

The present invention relates to hangers for supporting objects on a wall, and more particularly to single-piece hangers which penetrate thin or hollow walls, such as, wallboard or wood paneling, and when fully inserted, lock in place against rotation within, or removal from, its mounting hole.

2. Prior Art

In the past, secure attachment of wall-penetrating hangers to wallboard, or plaster walls, has been made difficult by the nature of the wall materials and the weight and movements to which the hangers are subjected. For example, wallboard (also known as sheet rock or dry wall) typically comprises a relatively thick layer of gypsum sandwiched between paper layers, and exhibits relatively soft composition, while plaster walls generally comprise substantially homogeneous construction, but suffer from a tendency to crumble or otherwise break down, when penetrated. Wood paneling is about $\frac{1}{8}$ to $\frac{1}{4}$ inch thick and can be plywood, masonite or compressed wood particles having a decorative face such as a wood grain face.

Most wall-penetrating hangers known in the prior art today display characteristics which are undesirable and render such hangers practically inoperable after a short period of time in use.

For example, wall-penetrating hangers of the kind typified by the patents to Jones U.S. Pat. No. 241,991 and Wagner U.S. Pat. No. 1,445,372 are wire-type hangers which are inserted through pre-drilled holes, and have portions with ends that pass through, and are positioned behind the wall. The ends abut and bear against the rear surface of the wall when weight is applied to the hook at the front of the wall. However, because of the repeated applications of weight to the hook, eventually the hole enlarges and the hanger works loose in its hole. Thus, the capacity of the hanger to anchor itself in the wall is substantially reduced and its weight-supporting function minimized. Wall-penetrating hangers of the kind exemplified by the patents to Smith U.S. Pat. No. 3,219,302 and Jones U.S. Pat. No. 2,789,783 employ penetrating or cutting tips on the free ends of the tail portion of each hanger.

In the Wagner patent, a single piece of wire, folded upon itself, is bent into an L-shaped body having a pair of legs normally tending to spread apart. Each leg has a tooth 6 on its free end for embedding itself into the rear wall surface after the hanger is inserted in an appropriate hole 11 predrilled in the wall. A metallic ferrule 8 having wall-engaging teeth 10 is carried by the legs, and after insertion and proper orientation of the legs behind the wall, the body 7 is pivoted forwardly and the ferrule simultaneously pushed rearwardly, so that as the tooth 6 of each leg pierces the wall, the teeth 10 of the ferrule bite into the outer surface and thus the wall is sandwiched and gripped between the legs and the ferrule.

In the later Jones patent U.S. Pat. No. 2,789,783, a wire hanger includes a hook portion 10, an arcuate hole-engaging portion 11 and a parabolic-shaped body portion 14 terminating in a flattened drill 17 provided with a cutting tip 18. A hole 2 is cut through a wall using the cutting tip 18 and the body portion 14 is pushed through the hole until firmly seated therein. The cutting tip 18 is of greater diameter than the diameter of the rest of the hanger and thus the hole 2 has a greater diameter than the diameter of hole-engaging portion 11 and body portion 14. The arcuate hole-engaging portion 11 wedges in the hole, with mid-section of said portion 11 engaging the bottom interior portions of hole 2 and the end sections of said portion 11 engaging the upper interior portions of hole 2 near the interior and exterior surfaces of the wall. The cutting tip 18 bears against the wall inner surface and the hook portion extends forwardly from the outer surface of the wall for appropriate use.

Neither of the Wagner or Jones '783 patents, however, have proven entirely satisfactory. The Wagner hanger requires a pre-formed hole and thus its mounting requires the use of tools which may not be readily at hand. Furthermore, none of the weight placed on the hook 7 is supported by the hole, but instead is supported by the teeth 10 of ferrule 8 and to some extent by the teeth 6 of the legs 5. Another disadvantage is that an accidental upward force applied to the hook 7 can easily dislodge the teeth 6 from the interior surface of the wall by pivoting the arms 5 about ferrule 8. In the Jones '783 patent, the particular parabolic-shape of the body portion 14 does not permit penetration of the cutting tip 18 into the rear surface of the wall, but provides a tangential contact as shown in FIG. 1 of the patent. Thus, rotation of the hanger relative to the opening in the wall easily occurs and upward and downwardly sliding of the tip 18 on the interior wall surface occurs. Furthermore, where the body portion unitarily merges with the hole-engaging portion, the parabolic shape is continued. Thus, there is effectively point-to-point contact between the opening and the hole-engaging portion, and such contact occurs effectively at only three points. This results in a structure that is not locked in the wall and which allows movement and eventual enlargement of the hole 2 and breakout of the hanger. The Jones parabolic-shaped body portion, moreover, is limited to use with substantially a single size of wall thickness, and other wall thicknesses cannot be accommodated by the same hanger.

Smith U.S. Pat. No. 3,219,302 discloses several modifications of wall hangers, all which have in common a pointed end 17, a curved semicircular portion 16 which is very similar to a right angle bend, a vertical leg 15 connected to the semicircular portion by a bend that is more gradual than a right angle bend, a horizontal portion 12 connected to the vertical portion 15 in a right angle bend, and an exterior vertical leg portion 18 connected to the horizontal portion 12 by a right angle bend. In inserting the Smith hanger into a wall the pointed end 17 is pushed perpendicularly with a reciprocal twisting motion into the wall at the desired location. The point 17 forms a hole through the wall and when the point 17 reaches the interior side of the wall the semicircular portion 16 is eased through the hole. However, the near right angle shape of semicircular portion 16 causes enlargement of the hole made through the wall by the point 17 and, in addition, the right angle between the vertical portion 15 and the horizontal portion 12 further enlarges the hole in the wall. Furthermore, the semicircular portion 16 is free to slide up and down or sideways with the interior surface of the wall. It does not dig into the interior surface of the wall to result in tensioning those parts of the hanger extending between those points where it contacts the inner surface of the wall. While the patent speaks of a snap-in action, the undue enlargement of the hole formed by point 17 when the semicircular portion 16 and the right angle bend between horizontal and vertical portions 12 and 15 are forced through the hole contribute very little resistance to pivoting of the hanger and dislodgement from its position upon the application of an upward force to the threaded portion 19 or hook portion 14Y or 25 of the Smith hanger. Any spring bias provided by the interior portions of the Smith hanger tends to assist the pivoting of the horizontal portion 12 in the wall such that vertical portion 18 and semicircular portion 16 are urged away from the wall surface. This contributes to an unstable characteristic of the Smith hanger such that upward forces accidentally applied to the exterior portions of the hanger will cause pivoting of the hanger in the hole and over a period of time will result in such ultimate enlargement of the hole as to allow the hanger to fail. Since the semicircular portion 16 is free to move upward or downward on the interior surface of the wall, there is no spring bias created which would force the horizontal portion 12 against the lower portions of the hole in the wall or to counteract the effects of a weight acting on the hook portion. The Smith patent fails to disclose or suggest the invention disclosed and claimed herein.

SUMMARY OF THE INVENTION

The present invention provides a hanger of the type used with plaster, gypsum, wood and the like walls, wherein the hanger is easy to use and includes means for substantially irreleasably locking it in place at its mounting location against rotation relative to the wall, and against pivoting out of or removal from, the mounting hole. The hanger of the present invention includes a one-piece spring wire element having a straight shank or mounting portion which connects a front hook portion or hanging element, and a rear locking portion. The latter has a parabola-like shape, terminates in a pointed penetrator, and overlies substantially all of the shank portion. A disc or flange is fixed on the forward outer end portion of and in perpendicular relation with the straight shank or mounting portion and abuts substantially flush with the wall when the hanger is mounted on the wall. In mounting the hanger on the wall, the pointed penetrator is first forced through the front face of the wall to form a hole through the wall. As the hanger is advanced through the hole, the penetrator arches upwardly until it abuts, and then pierces and imbeds itself in the rear wall surface. Final, complete seating of the shank portion in the mounting hole does not occur until the shank portion is moved a defined distance further into the hole, so that the curvature of the locking portion deforms by bowing out rearwardly and the shank portion locks into the hole in the wall with a snap action. Removal of the hanger from the wall is thus prevented until the locking portion is restored to its original curvature by application of an appropriate forwardly directed or pulling force of considerable magnitude applied to the hanging element. The amount of pulling force required to "unlock" the shank portion from the hole is surprisingly large. The rear locking portion when bowed out and tensioned due to the pointed penetrator being anchored in the inner surface of the wall, exerts an unexpectedly large force on the shank pressing it very strongly against the bottom of the hole and prevents the shank from moving out of the hole.

The hanger of this invention is a new and unique item that can be used to hang a variety of different objects, from the very light in weight up to 50 lbs. and from the very small in size up to something that is quite large. It includes a spring wire formed in a special shape with a small disc affixed to it a short distance (e.g., ¼" to 1") from one end. The short (e.g., ¼" to 1") outer protrusion from the disc can be in two forms, one being a straight piece with a slight cant upward or it can be shaped in the form of a hook. The other (inner) end has a very sharp point which can be provided with sharp cutting threads starting a short distance (e.g., about 1/16" in from the tip of the penetrator to aid in penetrating the wall. The main body of the wire is formed in a partial arc that is similar to a parabola. It comes out straight a short distance, e.g., approximately ¾", from the back of the disc and then arches upward and around for another ¾" or so and then veers upward from the arc in a short generally straight section that is inclined with respect to the plane of the disc and the wall.

The straight outer protrusion type with the slight cant upward also has a plastic tube-like extension on the protrusion which can be added to accommodate the holes in the handles of kitchen utensils and other objects which could not be hung on the short, e.g., ¼", protrusion alone. The reason for the short, e.g., ¼", protrusion is that such a device would not be overly visible so as to take away from the aesthetic value of the object. With the hanger of this invention you only see the small wire end. Using a regular or even a decorative picture hanger tends to detract from the object being hung. Objects such as gun racks and other items that are hung by rings also lend themselves to straight type hangers or the hook type hanger on the front because, here again, the outer conventional hangers tend to look large and out of proportion to the item being hung.

The hangers of this invention can be used in wood or masonite paneling from ⅛" to 5/16" thick and in wallboard from ⅜" to ½" thick because of the unique spring action of the wire form which will automatically adjust to all of these wall thicknesses. The hangers of this invention have the same size wire forming the front or hanger sections as is being used to form the wall penetrator portion. To back up the strength, a greater size of wire can be used in the front hook or straight section only or in both the back and front sections. The extension for the straight type front section can be made of a number of different materials, e.g., plastic, rubber, etc., and can be attached in a number of different ways.

In use, the sharp end of the wire is pushed into the wall until the threaded part comes in contact with the wall, and then the hanger is screwed generally horizontally through the wall as you would with any threaded screw. When the threaded part comes out the back side of the wall the wire form is pushed in until the disc is flush against the wall. The arc in the wire will force it to go upward until the point comes in contact with the back of the wall. The wire will then bow out towards the back locking the device to the wall, and enabling it to hold substantial amounts of weight which can be varied with the size of wire used.

OBJECTS OF THE INVENTION

It is therefore an object of the present invention to provide a wall hanger which substantially irreleasably locks itself in a wall when mounted.

Another object of the present invention is to provide a single-piece wall hanger which requires no tools for mounting and when mounted is held in place against rotation relative to, or removal from, its mounting hole.

Still another object of the invention is to provide a spring wire wall hanger which requires no pre-drilled holes for mounting, and which includes a curved locking portion capable of a substantial increase in curvature, i.e., decrease in radius of curvature, when mounting of the hanger is completed thereby generating extremely strong locking forces which prevent any movement of the hanger in its mounting hole during use.

Yet another object of the invention is to provide a wall hanger having a curved locking portion terminating in a penetrator for penetrating the inner surface of the wall in which it is mounted thereby preventing swinging movement of the hanger about its mounting shank.

Other objects and many of the attendant advantages of this invention will be appreciated as the same becomes better understood with reference to the following detailed description, and the accompanying drawings in which like reference numerals designate like parts throughout the figures thereof and wherein:

BRIEF DESCRIPTION OF THE DRAWINGS

FIG. 1 is a side view of a preferred embodiment of the hanger of the instant invention;

FIG. 2 is a front view of the hanger of FIG. 1;

FIG. 3 illustrates the initial position of the hanger of FIG. 1 in the early stage of penetration into the wall;

FIG. 4 shows the hanger of FIG. 1 in the later stage of penetration but just before final seating, in a wall;

FIG. 5 shows the hanger of FIG. 1 locked in place in the wall after final seating; and FIG. 6 depicts an alternate to the hook portion of the hanger of the present invention.

DETAILED DESCRIPTION OF THE INVENTION

Referring now to the drawings wherein like characters and numerals designate like or corresponding parts throughout the several views, there is shown in FIG. 1 and FIG. 2 a preferred embodiment of the wall-engaging hanger of the present invention. As shown, the hanger is made from an appropriately chosen gauge of spring steel wire, and generally includes a hanger portion 20, a shank or mounting portion 25, and a locking portion 27. The hanger portion 20 includes a flange or disc 23 welded, soldered or otherwise securely fastened on the wire, with an elbow 22 projecting forwardly thereof. From the elbow, the wire extends first downwardly, and then reversely upwardly, to terminate below the elbow and defines a hook 24 from which objects to be hung on the wall may be suspended. The disc 23 is positioned on the wire just behind the elbow, and preferably has a tapered front side and a flat rear side normal to the wire defining the shank portion 25 which extends rearwardly therefrom. The shank portion 25, unlike those of the hangers known in the prior art, and particularly unlike the hanger taught by the Jones '783 patent discussed above, comprises a straight section 25 of wire disposed substantially normal to the disc 23. The locking portion 27 of the hanger is a section of wire unitary with the shank portion and possesses a generally parabolic form defining a C-shaped spring. The parabolic curvature diminishes gradually as the locking portion 27 extends upwardly from the shank portion first rearwardly and then forwardly. The locking portion 27 terminates in a tail portion 28, the free end of which has a sharp point 30 for ease of penetration thereof into a wall W (seen in FIGS. 3–5) and is further threaded with cutting threads 29 beginning a short distance (e.g., 1/16") from the point 30 and extending along the taper up to the point where the diameter of the wire is constant. The point 30 and cutting threads 29 facilitate insertion through the wall.

It is noted in FIG. 1 that the point 30 is spaced rearwardly from the plane P of the interior surface of disc 23 a distance "x" which is less than the thickness of wall W. In fact the point 30 can extend up to the plane P of the interior surface of disc 23 (in which case "X" is 0) and even forward of it (in which case "X" is a minus quantity). The closer the point 30 gets to the plane P of the disc's rear surface rearward of said plane, and the farther it gets from said plane forward of said plane, the greater is the spring tensioning distortion imposed on locking portion 27, the greater is the force needed to snap the shank 25 into the hole H in wall W and the greater is the force needed to dislodge the hanger from its position on the wall.

Mounting of the hanger of the present invention in a wall W is illustrated in FIGS. 3, 4 and 5. Referring first to FIG. 3, the tail portion 28 is positioned approximately normal to the wall W with the point 30 adjacent to, and pointed at, the wall outer surface $W_o$. The hanger is pushed rearwardly toward the wall until the point 30 pierces the wall outer surface. By gripping the locking portion 27 between the fingers, the user pushes the tail portion 28 rearwardly and simultaneously rotates the shank portion 25 about the free end 29 to produce a threading and cutting effect. It can be appreciated now that any requirement for a pre-formed hole, prior to insertion of the hanger into the wall, is eliminated. The tail portion 28 of the hanger is pushed through the wall W with the locking portion 27 passing completely through the wall W, after which the shank 25 partially seats within the hole as the point 30 of the tail portion, due to the curvature of locking portion 27, swings upwardly to penetrate the inner surface $W_i$ of the wall. When the point 30 of the tail portion 28 first makes contact with the wall inner surface $W_i$, as illustrated in FIG. 4, the disc 23 is not completely seated against the wall outer surface $W_o$ but instead is located some distance "a" from the wall. Imparting further movement to the shank portion so that it moves through the wall over the distance "a" causes the point 30 to be pressed more firmly into engagement with and become embedded in the inner surface $W_i$ of the wall, and become anchored therein. Simultaneously the hanger locking portion, as a consequence of its resilience and curvature, abruptly deforms by a "snap action" through a distance "b" (see FIG. 5). In undergoing this deformation, the curvature of the locking portion between the point where the tail portion intersects the wall inner surface and the point where the shank portion intersects the wall inner surface increases in concavity and becomes substantially more circular. This increase in curvature and the terminal configuration of the hanger when completely mounted in wall W is illustrated in FIG. 5 of the drawings. The location of the point 30 of the tail portion 28, relative to the opening H formed in the wall as a result of insertion of the hanger does not change during or after the "snap-action" deformation of the locking portion 27. However, the distance "y" from point 30 to the plane P of the inner surface of disc 23 of the fully installed hanger is considerably greater than the distance "x" from point 30 to plane P before installation of the hanger.

The effect of the deformation is two-fold. First, it acts to generate forces in the locking portion 27 tending to increase its radius of curvature, with the spring forces being proportional to the deformation "b" of the locking portion. The spring force and distance "b" are in turn also affected by the magnitude of distance "x", the smaller the value of "x", the greater the distance "b" and the spring force. This generated spring force acts to press the shank 25 in a direction away from the point 30 of the tail portion 28 and into firm engagement with the side of the wall opening H opposite the free end, i.e. the bottom surface of opening H. In this way, the hanger is locked against movement of any kind relative to the opening H in the wall W, and further, is prevented from being removed from the wall W until the spring force is overcome (e.g., by application of force of an amount sufficient to move the shank portion out of the opening H in the wall). Quite surprisingly, this has turned out to be quite a large force in the present invention. Secondly, deformation of the locking portion 27 coupled with the innate resilience of the wire hanger permits the hanger to be used effectively with walls having varying thicknesses, generally in the range of from about $\frac{1}{8}''$ (paneling) to about $\frac{1}{2}''$ (wallboard). Such accommodation of size range of wall thickness is possible because the radius of curvature of the locking portion is chosen sufficiently small so that the free end of the tail portion overlies substantially all of the shank portion when the hanger is in its undeformed state but sufficiently large that the opening H is not enlarged beyond the diameter of the wire from which the hanger is made. Obviously, the length of shank 25 must be at least as long as the thickness of wall W.

FIG. 6 illustrates an alternate embodiment of the hanger in which the hanging element comprises a straight portion 32 projecting forwardly of flange 33 and upwardly at an angle $\theta$ from an axis defined longitudinally along shank portion 35 (shank 25 in FIGS. 1-5). The angle $\theta$ is preferably chosen in the range of 5° to 30°, but other angles greater than those specified are contemplated and could provide utility for suspension of heavier or more cumbersome articles. A plastic sleeve 40 may optionally be provided on the end of the straight portion 32 for a variety of purposes, as for example, to provide an extension to accommodate the holes in handles of utensils and other objects not supportable by the straight portion 32 alone; to protect items hung thereon from damage which might otherwise result from contact with the straight portion; to provide a sufficiently long surface to support a nonrigid or flacid article thereon, such as a towel or potholder.

There has therefore been described a hanger which, when completely inserted in a supporting wall, becomes locked against rotation within, or removal from, its mounting hole. The hanger can be used to support a variety of objects as well as an extremely wide range of loads (weight and size) depending on the gauge of wire used. In a common household application, the hanger is made from spring wire, and includes a hook portion formed either as a hook or a straight section. The hanger further includes an anchor or locking portion having a parabolic curvature exhibiting spring characteristics and carrying on its free end a wall-penetrating point. Locking of the hanger in the wall occurs when, upon being fully inserted in the wall, the locking portion deforms with a "snap-action" by bowing out and effecting a change in the curvature from the parabolic shape to a more circular shape.

The hanger of the present invention advantageously can accommodate different thicknesses of walls as a result of the spring action of the wire form. Furthermore, added strength of the hanger may be obtained by employing different materials or larger gauge wire, and the hook portion and locking portion may be formed disparately.

Obviously, many modifications and variations of the present invention are possible in light of the above teachings. It is therefore understood that, within the scope of the appended claims, the invention may be practiced otherwise than as specifically described.

What is claimed is:

1. A locking wall hanger mounting in a wall for supporting articles thereon, comprising:

in combination with a wall, a curved wire having a first end, a second end, and a central portion;

said first end being adapted to receive articles for hanging thereon;

an abutment member fixed to said curved wire at a location adjacent said first end;

said abutment member having a wall contacting surface;

said second end terminating in a sharp point;

said second end being adapted to pierce said wall and being inserted therethrough, said insertion defining a straight passage through said wall;

said curved wire being sufficiently resiliently deformable that passing of said curved wire into said wall results in a passage having a snug fit about said wire and causes temporary resilient straightening of any portion of said wire passing through the wall so that the diameter of the passage is not substantially greater than that of the wire that during insertion of said wire therethrough;

said central portion being generally in the shape of a parabola; a first portion of said curved wire adjacent said first end being substantially straight along a predetermined length thereof;

said first portion of said curved wire being connected to said central portion of said curved wire, said first portion being disposed in the passage;

in an undeformed condition, said sharp point terminating at a predetermined distance "X" as measured from a line perpendicular to a plane which contains said wall contacting surface and which is generally perpendicular to said straight portion of said curved wire;

said distance "X" being less in value than the thickness of the wall in which said curved wire is inserted;

said curved wire being adapted for manual insertion into the wall;

said central portion of said curved wire having a minimum radius of curvature sufficiently large that the passageway is not enlarged due to a spring force in said central portion, which force tends to return said central portion to its original parabolic shape during insertion of said central portion into the passage; said minimum radius of curvature being sufficiently small that said second end substantially overlies a substantial portion of said first portion of said curved wire;

said curved wire having a first position wherein said curved wire passes snugly through the passage in the wall created by said second end, with said sharp point of said second end contacting a rear side of the wall and said first end remaining on a front side of the wall, without deformation of said central portion of said curved wire;

said wall contacting surface of said abutment member in said first position being spaced away from the front surface of the wall;

said curved wire being movable from said first position to a second position by movement of said wall contacting surface of said abutment member into contact with the wall; said central portion of said curved wire being resiliently deformed in going from said first position to said second position such that said force arises in said central portion of said curved member due to its resiliency urging said second end and said first end toward one another creating a snap action in moving from said first position to said second position;

said force tending to retain said abutment member in said second position adjacent the wall;

whereby said second position is stable due to resiliency of said curved wire, so that a snap action retains said abutment member against the wall even when no external load is applied to said first end, and whereby due to the resiliency of said curved wire, the passage in said second position remains snugly fitting and is not substantially enlarged from its initial size when it is created by entry of said second end into the wall.

2. The combination as claimed in claim 1, wherein said first end of said curved wire has a curved shape;

said first portion having a length generally in a range of three-quarter inch;

said central portion having a length generally in a range of three-quarter inch;

said curved wire being composed of spring steel;

whereby said curved wire is usable in wood and masonite panelling in a range from one-eighth to five-sixteenth inch thickness, and in wallboard in a range from three-eighth to one-half inch thickness;

whereby said first end serves as a hook.

3. The combination as claimed in claim 1, wherein said first end of said curved wire is a hook disposed downwardly from said straight portion, said hook being adapted to receive at least an article thereon for hanging when said curved wire is in said second position.

4. The combination as claimed in claim 1, wherein said first end of said curved wire is a generally straight member extending upwardly at an angle to said straight portion of said curved wire, said straight member being adapted to receive at least an article thereon for hanging when said curved wire is in said second position.

5. The combination as claimed in claim 1, wherein said generally straight member has a sleeve thereon, said sleeve being of a different material from said curved wire.

6. The combination as claimed in claim 1, wherein said sharp point has threading thereon, said sharp point being adapted for use as an augur for penetrating the wall.

7. The combination as claimed in claim 5, wherein said sleeve comprises plastic.

8. The combination as claimed in claim 1, wherein said abutment member comprises a generally disc-shaped article.

9. The combination as claimed in claim 1, wherein said curved wire is shaped such that, in said second position, at said second end only said sharp point contacts said wall.

* * * * *